(12) United States Patent
Mathew

(10) Patent No.: US 8,209,659 B2
(45) Date of Patent: Jun. 26, 2012

(54) METHOD AND APPARATUS FOR CREATING A CUSTOM WORKFLOW

(75) Inventor: Manoj M. Mathew, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 1203 days.

(21) Appl. No.: 11/495,247

(22) Filed: Jul. 28, 2006

(65) Prior Publication Data

US 2008/0028363 A1    Jan. 31, 2008

(51) Int. Cl.
*G06F 9/44*    (2006.01)

(52) U.S. Cl. ........ 717/105; 717/108; 717/109; 717/111; 717/113

(58) Field of Classification Search .......... None
See application file for complete search history.

(56) References Cited

U.S. PATENT DOCUMENTS

| 7,337,950 | B2 * | 3/2008 | DeVault | 235/376 |
| 2004/0078373 | A1 * | 4/2004 | Ghoneimy et al. | 707/10 |
| 2007/0011334 | A1 * | 1/2007 | Higgins et al. | 709/227 |
| 2007/0067373 | A1 * | 3/2007 | Higgins et al. | 707/206 |

* cited by examiner

*Primary Examiner* — Chuck Kendall
(74) *Attorney, Agent, or Firm* — Park, Vaughan, Fleming & Dowler LLP

(57) ABSTRACT

One embodiment of the present invention provides a system for creating a custom workflow which facilitates performing repetitive processes by aggregating application-screens. During operation, the system receives a request from a client to open an application-screen for an application. In response to the request, the system opens the application-screen. Next, the system receives a request to add the application-screen to a custom workflow. In response to the request, the system adds the application-screen to the custom workflow.

32 Claims, 9 Drawing Sheets

7/17/2006 TO 7/21/2006 REPORT 600

MONDAY

| SCREENS | COMMANDS | TIME-SPENT | ACCESSED |
|---|---|---|---|
| ① VENDORS | ADD | 30 MIN | M 9:06 |
| ② ORDERS | ORDER | 2 HRS | M 9:36 |
| | ORDER | | |
| ③ ACCOUNTS | BALANCES | 4 HRS 12 MIN | M 13:30 |
| ⑤ BILLS | UPDATE | 3 HRS 23 MIN | M 13:45 |
| | PAY | | |

TUESDAY

| SCREENS | COMMANDS | TIME-SPENT | ACCESSED |
|---|---|---|---|
| ORDERS | ORDER | 1 HR 38 MIN | T 9:20 |
| | ORDER | | |
| ACCOUNTS | BALANCES | 18 MIN | T 14:11 |
| ④ INVOICES | ENTER INVOICES | 2 HRS 23 MIN | T 14:29 |
| BILLS | PAY | 2 HRS 17 MIN | T 15:36 |

WEDNESDAY

| SCREENS | COMMANDS | TIME-SPENT | ACCESSED |
|---|---|---|---|

THURSDAY

| SCREENS | COMMANDS | TIME-SPENT | ACCESSED |
|---|---|---|---|
| VEHICLE | ENTER MILEAGE | 7 MIN | R 11:18 |
| INVOICES | ENTER INVOICES | 3 HRS 25 MIN | R 11:23 |
| ORDERS | ORDER | 1 HR 10 MIN | R 12:35 |
| DEPOSITS | UPDATE DEPOSITS | 14 MIN | R 17:09 |

FRIDAY

| SCREENS | COMMANDS | TIME-SPENT | ACCESSED |
|---|---|---|---|
| TIME WORKED | UPLOAD | 5 MIN | F 9:20 |
| EMPLOYEE LIST | UPDATE | 2 HRS 2 MIN | F 9:25 |
| | PAY | | |

[ SUGGEST WORKFLOW ]  [ SAVE WORKFLOW ]  [ PRINT ]  [ CLOSE ]

FIG. 6

METHOD AND APPARATUS FOR CREATING A CUSTOM WORKFLOW

BACKGROUND

Related Art

It is presently common for a single software product to have hundreds of features and just as many application-screens. Users typically access only a small percentage of these features and access an even smaller percentage of application-screens in their day-to-day usage of a software product. However, it is difficult for software developers to anticipate which features users will commonly access. Furthermore, different users will access different features. Thus, it is very difficult, if not impossible, for software developers to design a user interface to support a workflow that is optimal for all users of the software product.

Many users purchase software products to assist in completing time-consuming tasks. However, a poor workflow can cause a user to spend a significant amount of time searching for desired features and application-screens. This wasted time can sometimes offset the time-savings gained from using the software product in the first place. Hence, if a software product is not configured for a user's workflow, the software product may be less useful in completing time-consuming tasks for the user.

SUMMARY

One embodiment of the present invention provides a system for creating a custom workflow which facilitates performing repetitive processes by aggregating application-screens. During operation, the system receives a request from a client to open an application-screen for an application. In response to the request, the system opens the application-screen. Next, the system receives a request to add the application-screen to a custom workflow. In response to the request, the system adds the application-screen to the custom workflow.

In a variation on this embodiment, the system receives a request to save the custom workflow. In response to the request, the system saves the custom workflow on a non-volatile storage medium.

In a further variation, saving the custom workflow can involve associating the custom workflow with an icon, which can be added to a toolbar, or a menu. The system can also associate the custom workflow with a user-profile.

In a variation on this embodiment, the system receives a request to execute the custom workflow. In response to the request, the system executes the custom workflow by opening a subset of application-screens associated with the custom workflow. (Note that the subset of application-screens can include the entire set of application-screens associated with the custom workflow.)

In a further variation, the custom workflow is executed in response to the system receiving a request from the client to execute the custom workflow.

In a further variation, the custom workflow is executed in response to the system receiving an indicator representing a user-profile associated with a user, wherein receiving the indicator enables the application to execute a custom workflow associated with the user-profile.

One embodiment of the present invention provides a system for determining a custom workflow which facilitates performing repetitive processes by aggregating application-screens. During operation, the system receives a request from a client to determine application-usage statistics for an application. In response to the request, the system monitors the client's usage of the application to obtain the application-usage statistics. Next, the system sends the application-usage statistics to the client to aid the client in determining a custom workflow. The system then receives the custom workflow from the client.

In a variation on this embodiment, the request to determine application-usage statistics can include a list of the desired application-usage statistics.

In a variation on this embodiment, the request to determine application-usage statistics can include a time-period rule, which specifies a time-period for monitoring the client's usage of the application.

In a variation on this embodiment, the application-usage statistics can include: an application-screen set which specifies a set of application-screens accessed by the client; a sequence-record which specifies the order that the client accessed the set of application-screens; an access-time record which specifies when the client accessed the set of application-screens; a usage-time record which specifies how long the client accessed each application-screen in the set of application-screens; and a usage-record which specifies a set of operations executed while each application-screen in the set of application-screens was active.

In a variation on this embodiment, sending the application-usage statistics to the client involves sending a suggested custom workflow to the client.

In a variation on this embodiment, receiving the custom workflow can involve receiving an icon associated with the custom workflow. The system can also receive a user-profile associated with the custom workflow.

In a variation on this embodiment, the system receives a request to execute the custom workflow. In response to the request, the system executes the custom workflow by opening a subset of application-screens associated with the custom workflow. (Note that the subset of application-screens can include the entire set of application-screens associated with the custom workflow.)

In a further variation, the custom workflow is executed in response to the system receiving a request from the client to execute the custom workflow.

In a further variation, the custom workflow is executed in response to the system receiving an indicator representing a user-profile associated with a user, wherein receiving the indicator enables the application to execute a custom workflow associated with the user-profile.

BRIEF DESCRIPTION OF THE FIGURES

FIG. 6 illustrates a report window in accordance with an embodiment of the present invention.

DETAILED DESCRIPTION

Figure 1:
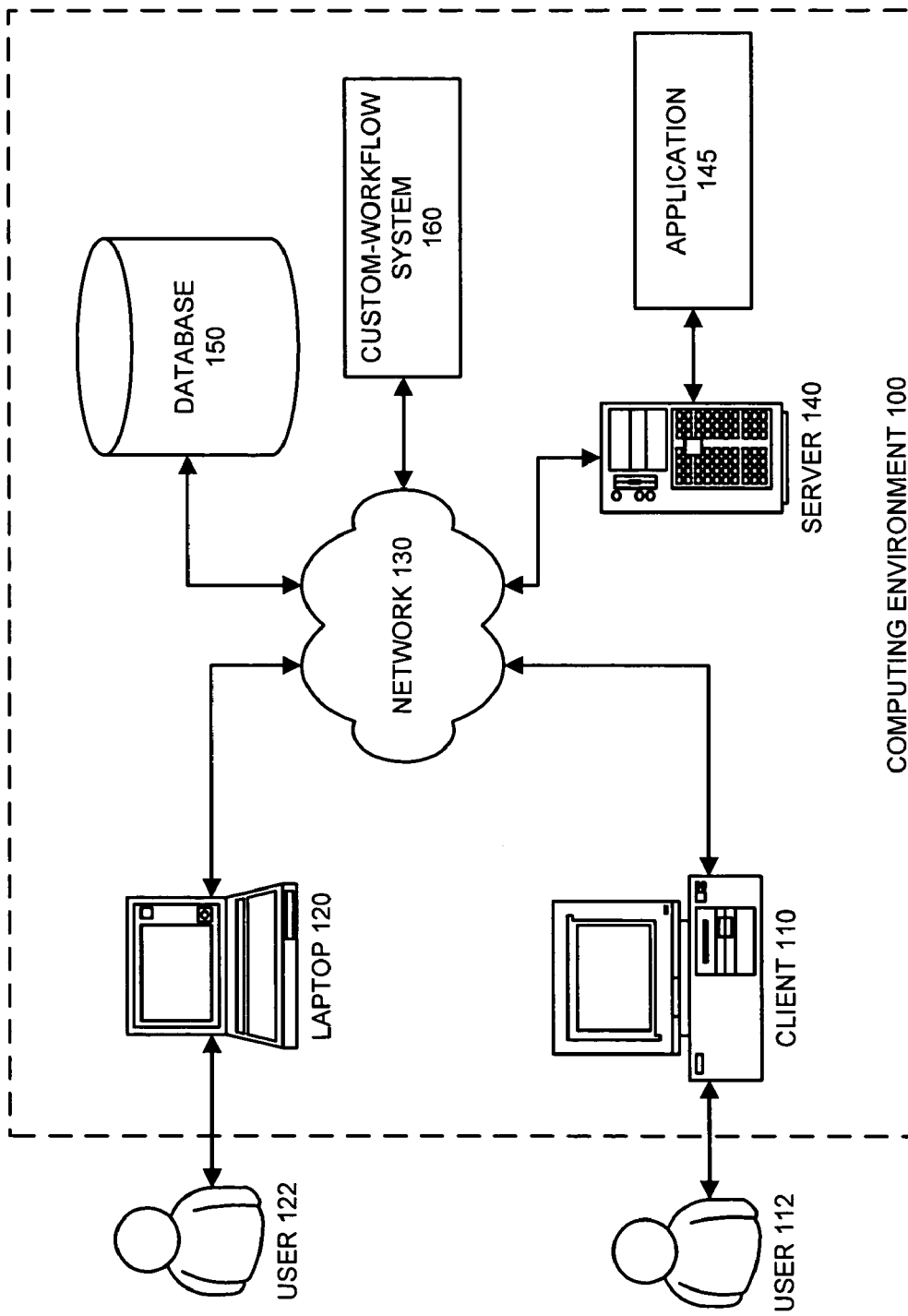
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a custom-workflow system. This custom-workflow system enables a user to bookmark and aggregate application-screens that the user often visits and accesses within an application to create a custom workflow. Using the custom-workflow system, the user can associate the custom workflow with an icon and/or a user-profile. The user can also associate the custom workflow with a toolbar and/or menu.

In one embodiment of the present invention, when the user executes the custom workflow, the custom-workflow system opens a subset of bookmarked application-screens associated with the custom workflow. Note that the subset of bookmarked application-screens can include the complete set of bookmarked application screens associated with the custom workflow. Furthermore, the custom-workflow system can open the subset of bookmarked application-screens using a display format specified by the user. This display format can include: a tabbed display format, a side-by-side display format, a tiled display format, a cascade display format, or any other display format for displaying the subset of bookmarked application-screens known to those familiar with the art.

In one embodiment of the present invention, the custom-workflow system can monitor the user's interactions with the application to obtain application-usage statistics. The custom-workflow system can then aggregate the application-usage statistics to obtain aggregated application-usage statistics. Then, the custom-workflow system presents the aggregated application-usage statistics to the user to assist the user in developing the custom workflow. When presenting the aggregated application-usage statistics to the user, the custom-workflow system can present a suggested custom workflow to the user. Note that the custom-workflow system uses a combination of the application-usage statistics and a user-specified formula, or a pre-defined formula included with the custom-workflow system to create the suggested custom workflow. Furthermore, note that the user-specified formula and the pre-defined formula specify how to interpret and relate the application-usage statistics to obtain the suggested custom workflow.

Computing Environment

FIG. 1 illustrates a computing environment 100 in accordance with an embodiment of the present invention. Computing environment 100 includes a number of computer systems. These computer systems can generally include any type of computer system based on a microprocessor, a mainframe computer, a digital signal processor, a portable computing device, a personal organizer, a device controller, or a computational engine within an appliance. More specifically, computing environment 100 includes client 110, laptop 120, network 130, server 140, application 145, database 150, and custom-workflow system 160.

Client 110 and laptop 120 can generally include any node on a network including computational capability and including a mechanism for communicating across the network.

Network 130 can generally include any type of wired or wireless communication channel capable of coupling together computing nodes. This includes, but is not limited to, a local area network, a wide area network, or a combination of networks. In one embodiment of the present invention, network 130 comprises the Internet.

Server 140 can generally include any node on a computer network which comprises a mechanism for servicing requests from a client for computational and/or data storage resources.

Application 145 can generally include any computer program. As illustrated in FIG. 1, server 140 executes application 145. In one embodiment of the present invention, application 145 can include custom-workflow system 160.

Database 150 can generally include any type of system for storing data in non-volatile storage. This includes, but is not limited to, systems based upon magnetic, optical, and magneto-optical storage devices, as well as storage devices based on flash memory and/or battery-backed up memory. In one embodiment of the present invention, custom-workflow system 160 includes database 150.

Custom-workflow system 160 can generally include any type of system for collecting and processing application-usage statistics, and for suggesting and creating a custom workflow. As illustrated in FIG. 1 custom-workflow system 160 resides on a stand-alone. However, note that in other embodiments of the present invention, custom-workflow system 160 can reside on client 110, laptop 120, server 140, or database 150. Furthermore, note that server 140 can include application 145 and custom-workflow system 160.

In one embodiment of the present invention, user 122 is a software developer who designed and created application 145. Suppose that user 122 creates application 145 assuming that mostly large organizations, with distinctly separate job functions for each of its employees, will use application 145. In this case, user 122 groups many features and application-screens based on how user 122 perceives the division of labor in a large organization. However, another user 112, who is an employee at a small organization, may have many responsibilities and may hence find the layout of application 145 less efficient for the job functions that user 112 typically performs. More specifically, user 112 may have to traverse several sub-menus to access application-screens which user 112 accesses on a daily basis. Finding these screens can be inconvenient for user 112. In this example, user 112 can use custom-workflow system 160, to create a custom workflow that can help increases user 112's productivity by aggregating a set of application-windows that user 112 often uses. Furthermore, user 112 can associate a menu item or toolbar icon with the custom workflow to make the custom workflow more accessible. Moreover, custom-workflow system 160 can automatically open and arrange a subset of application-windows that user 112 accesses each time user 112 executes application 145.

In one example, suppose user 112 is unsure of which set of application-windows to bookmark to create the most useful custom workflow. In this case, user 112 can instruct custom-workflow system 160 to monitor user 112's usage of application 145 for a specified period of time, such as for one week. At the end of this time, custom-workflow system 160 produces a report that includes: a summary of the application-screens that user 112 accessed; a summary of the total time user 112 spent accessing each application-screen; a summary of the tasks user 112 performed on each application-screen; and a suggested custom workflow. Upon examining the report, user 112 can create two custom workflows: one for daily use, which custom-workflow system 160 suggested; and one for Fridays, which user 112 creates based on the report received from custom-workflow system 160.

Sample Application

Figure 2:
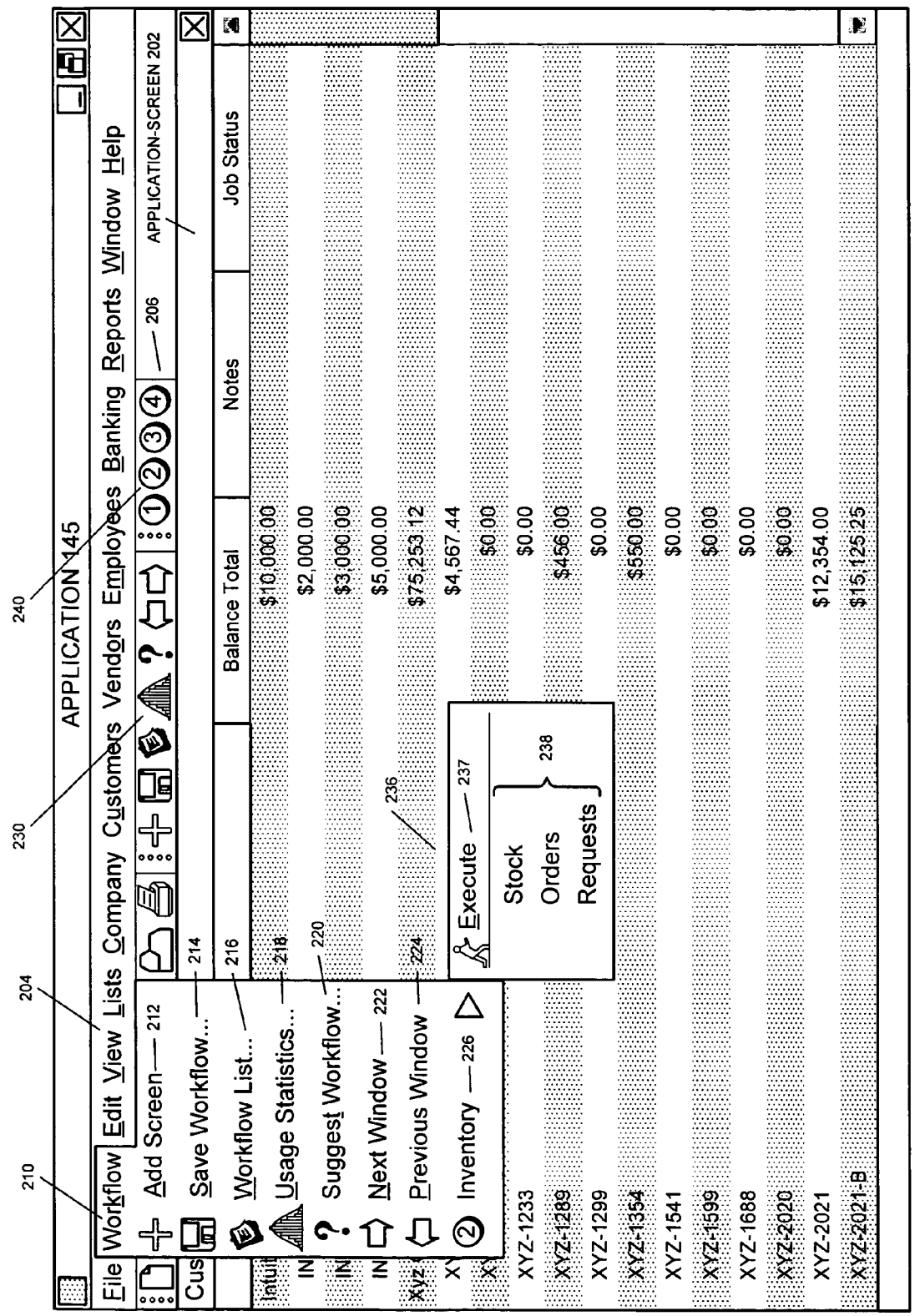
FIG. 2 illustrates an application in accordance with an embodiment of the present invention.

FIG. 2 illustrates an exemplary application 145 in accordance with an embodiment of the present invention. Application 145 includes application-screen 202, menu 204, and toolbar set 206.

Menu 204 includes several sub-menus including workflow sub-menu 210. Workflow sub-menu 210 includes a number of menu items related to the present invention. These items include: add screen 212, save workflow 214, workflow list 216, usage statistics 218, suggest workflow 220, next window 222, previous window 224, and inventory 226.

The add screen 212 command bookmarks the currently active application-screen, which in this case is application-screen 202. When user 112 selects add screen 212, custom-workflow system 160 adds application-screen 202 to a custom workflow that user 112 selects for editing. User 112 selects this custom workflow from a workflow list, which user 112 views by selecting workflow list 216.

In one embodiment of the present invention, if user 112 does not select a custom workflow to edit, then custom-workflow system 160 automatically creates a new custom workflow. In this case, custom-workflow system 160 can add any additional application-screens that user 112 selects to the new custom workflow. Note that user 112 can select additional application-screens to add to the custom workflow by clicking add screen 212.

The save workflow 214 command opens a save-custom-workflow window that includes options related to saving a custom workflow. The save-custom-workflow window is described in more detail below with reference to FIG. 3.

The workflow list 216 command opens a custom-workflow-list window that lists previously saved custom workflows. The custom-workflow-list window is described in more detail below with reference to FIG. 4A.

The usage statistics 218 command opens a usage-statistics window that includes options related to creating a report of usage statistics for application 145. The usage-statistics window is described in more detail below with reference to FIG. 5.

The suggest workflow 220 command opens a report window that includes a report of usage statistics, and a suggested custom workflow based on the report of usage statistics. The report of usage statistics can be a previously generated report that user 112 selects from a set of saved reports stored in database 150, or a newly generated report that custom-workflow system 160 generates from a pre-defined set of options or a user-defined set of options. The report window is described in more detail below with reference to FIG. 6.

The next window 222 command enables user 112 to set the currently active application-screen to be the next application-screen in a linearly grouped set of application-screens associated with a custom workflow.

The previous window 224 command enables user 112 to set the currently active application-screen to be the previous application-screen in a linearly grouped set of application-screens associated with a custom workflow the currently active application-screen.

Inventory 226 is an example of a previously saved custom workflow. When user 112 selects inventory 226, custom-workflow system 160 reveals sub-menu 236. Sub-menu 236 includes execute command 237 and list 238, which includes the application-screens associated with custom workflow inventory 226. When user 112 selects execute command 237, custom-workflow system 160 automatically opens a pre-specified subset of the application-screens associated with the custom workflow inventory 226. Alternatively, user 112 can manually select an individual application-screen associated with custom workflow inventory 226 from list 238.

Toolbar set 206 includes toolbar 230 and toolbar 240. Toolbar 230 includes icons associated with toolbar items corresponding to the options listed in workflow sub-menu 210. Toolbar 240 includes icons associated with custom workflows. When user 112 selects one of the icons is toolbar 240, custom-workflow system 160 automatically opens a pre-specified subset of the application-screens associated with the custom workflow that corresponds to the selected icon.

In one embodiment of the present invention, user 112 can customize which options appear in workflow sub-menu 210, toolbar 230, and toolbar 240.

Save-Custom-Workflow Window

Figure 3:
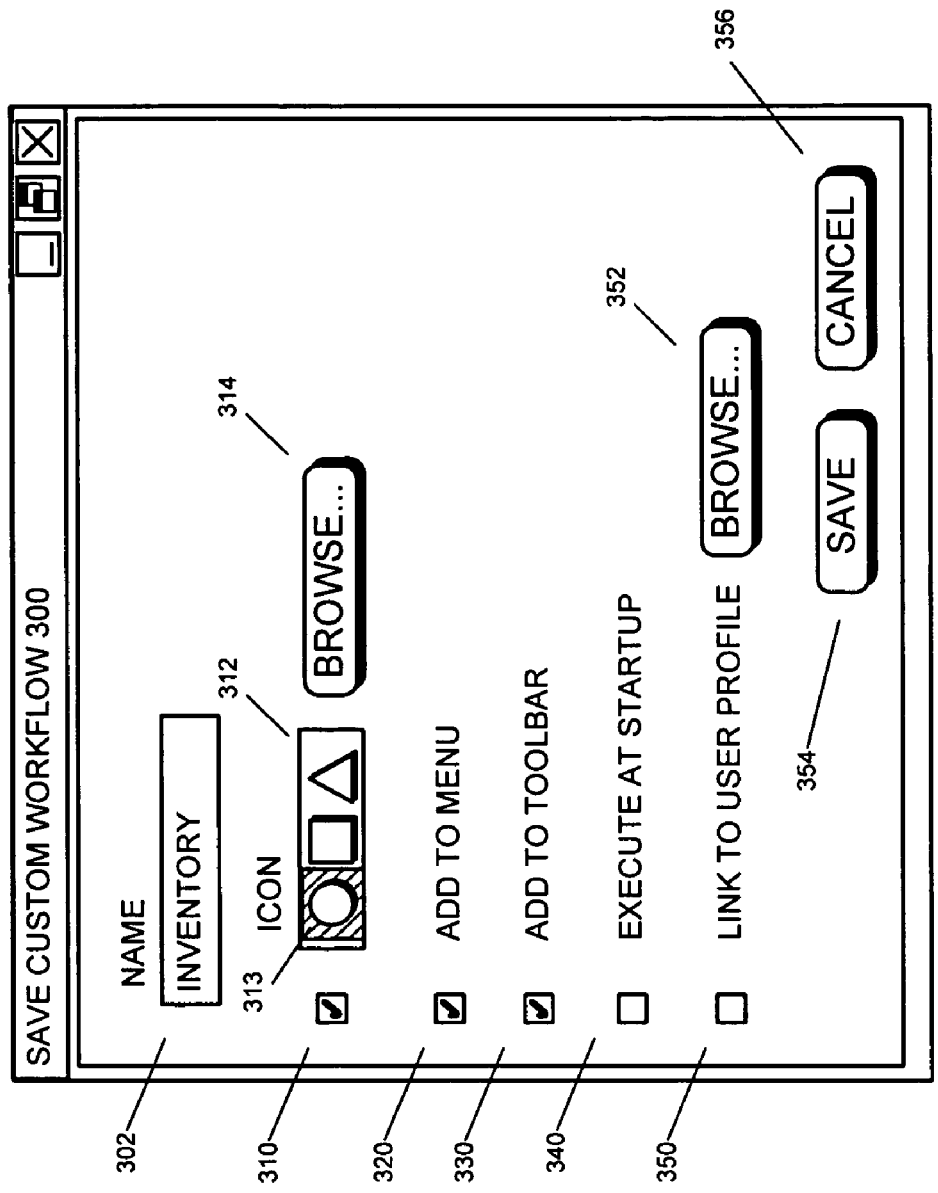
FIG. 3 illustrates a save-custom-workflow window in accordance with an embodiment of the present invention.

FIG. 3 illustrates a save-custom-workflow window 300 in accordance with an embodiment of the present invention.

When user 112 selects the save workflow 214 menu item, custom-workflow system 160 opens the save-custom-workflow window 300. Save-custom-workflow window 300 includes text field 302 and options 310, 320, 330, 340, and 350.

In one embodiment of the present invention, custom-workflow system 160 associates text that user 112 enters in text field 302 with the custom workflow that user 112 is saving. This text is the "name" of the custom workflow that user 112 is saving.

In one embodiment of the present invention, user 112 selecting option 310 instructs custom-workflow system 160 to associate an icon, such as highlighted icon 313, with the custom workflow that user 112 is saving. If user 112 does not like any of the icons available in icon selection box 312, user 112 can click browse button 314 to browse a computer system, such as client 110, for an icon that user 112 prefers.

In one embodiment of the present invention, selecting option 320 instructs the custom-workflow system 160 to add the custom workflow that user 112 is saving to workflow sub-menu 210.

In one embodiment of the present invention, selecting option 330 instructs custom-workflow system 160 to add the custom workflow that user 112 is saving to toolbar 240.

In one embodiment of the present invention, selecting option 340 instructs custom-workflow system 160 to execute the custom workflow that user 112 is saving each time user 112 executes application 145.

In one embodiment of the present invention, selecting option 350 instructs custom-workflow system 160 to associate the custom workflow that user 112 is saving with a user-profile. When this option is selected, custom-workflow system 160 presents a list of available user-profiles to user 112.

If user 112 wishes to change the user-profile selection, user 112 can click on browse button 352 to re-open the list of available user-profiles. This embodiment enables custom-workflow system 160 to present different custom workflows to users 112 and 122 based on the selected user-profile. Furthermore, if user 112 is associated with multiple user-profiles, user 112 can instruct custom-workflow system 160 to associate different custom workflows with different user-profiles belonging to user 112.

After selecting the options that user 112 desires, user 112 can click save button 354 to complete the process of saving the custom workflow. Custom-workflow system 160 will then save the custom workflow on database 150.

User 112 can click on cancel button 356 to close the save-custom-workflow 300 window without saving the custom workflow.

Custom-Workflow-List

Figures 4A, 4B:
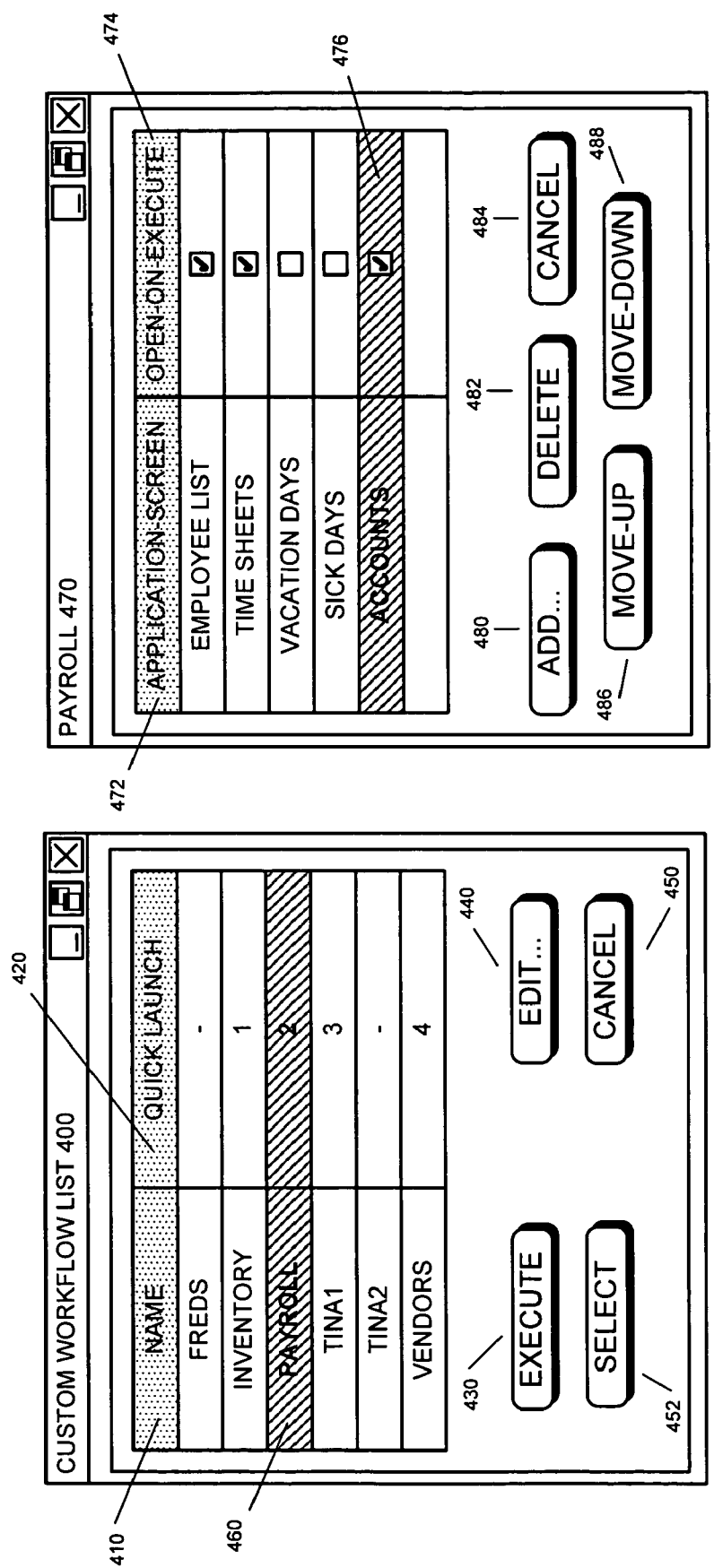
FIG. 4A illustrates a custom-workflow-list window in accordance with an embodiment of the present invention.
FIG. 4B illustrates a custom-workflow-edit window in accordance with an embodiment of the present invention.

FIG. 4A illustrates a custom-workflow-list 400 window in accordance with an embodiment of the present invention.

When user 112 selects the workflow list 216 menu item, custom-workflow system 160 opens the custom-workflow-list 400 window. The custom-workflow-list 400 window includes: a table with two columns, name column 410 and quick launch column 420; execute button 430; edit button 440; select button 452; and cancel button 450.

Name column 410 specifies the name of each custom workflow in the custom-workflow-list 400. Quick-launch column 420 specifies the order that user 112 listed the custom workflows that are included in toolbar 240.

In one embodiment of the present invention, clicking on execute button 430 instructs custom-workflow system 160 to execute a selected custom workflow, such as selected custom workflow 460. In this embodiment, each time user 112 selects add screen 212, custom-workflow system 160 adds the currently active application-screen, such as application-screen 202, to the selected custom workflow 460.

In one embodiment of the present invention, clicking on select button 452 instructs custom-workflow system 160 to make the selected custom workflow 460 the currently active custom workflow. In this embodiment, each time user 112 selects add screen 212, custom-workflow system 160 adds the currently active application-screen, such as application-screen 202, to the selected custom workflow 460.

In one embodiment of the present invention, clicking on edit button 440 instructs custom-workflow system 160 to open a custom-workflow-edit window. The custom-workflow system 160 can pre-fill the custom-workflow-edit window with information from a selected custom workflow, such as selected custom workflow 460. The custom-workflow-edit window is described in more detail below with reference to FIG. 4B.

User 112 can click on cancel button 450 to close the custom-workflow-list 400 window.

Custom-Workflow-Edit Window

FIG. 4B illustrates a custom-workflow-edit window 470 in accordance with an embodiment of the present invention.

When user 112 clicks on edit button 440, custom-workflow system 160 opens custom-workflow-edit window 470, and pre-fills application-screen column 472 and open-on-execute column 474 with information associated with selected custom workflow 460. The custom-workflow-edit window 470 includes: a table with two columns, application-screen column 472 and open-on-execute column 474; add button 480; delete button 482; cancel button 484; move up button 486; and move down button 488.

Application-screen column 472 specifies the name of each application-screen that selected custom workflow 460 includes. Open-on-execute column 474 specifies for each application-screen listed in application-screen column 472 whether custom-workflow system 160 is to open the application-screen upon user 112 clicking on execute button 430.

In one embodiment of the present invention, user 112 can place a check-mark in a check-mark box in open-on-execute column 474 to instruct custom-workflow system 160 to automatically open the associated application-screen each time user 112 requests that custom-workflow system 160 execute selected custom workflow 460.

In one embodiment of the present invention, clicking add button 480 instructs custom-workflow system 160 to display a list of application-screens thereby enabling user 112 to add additional application-screens to selected custom workflow 460.

In one embodiment of the present invention, clicking on delete button 482 instructs custom-workflow system 160 to delete a selected application-screen, such as selected application screen 476.

In one embodiment of the present invention, clicking on move-up button 486 instructs custom-workflow system 160 to move selected application-screen 486 higher in the list of application-screens included in application-screen column 472. This embodiment determines which application-screen custom-workflow system 160 opens or makes active when user 112 clicks on next window 222 or previous window 224.

In one embodiment of the present invention, clicking on move-down button 488 instructs custom-workflow system 160 to move selected application-screen 486 lower in the list of application-screens included in application-screen column 472. This embodiment determines which application-screen custom-workflow system 160 opens or makes active when user 112 clicks on next window 222 or previous window 224.

User 112 can click on cancel button 484 to close custom-workflow-edit window 470.

Usage-Statistics Window

Figure 5:
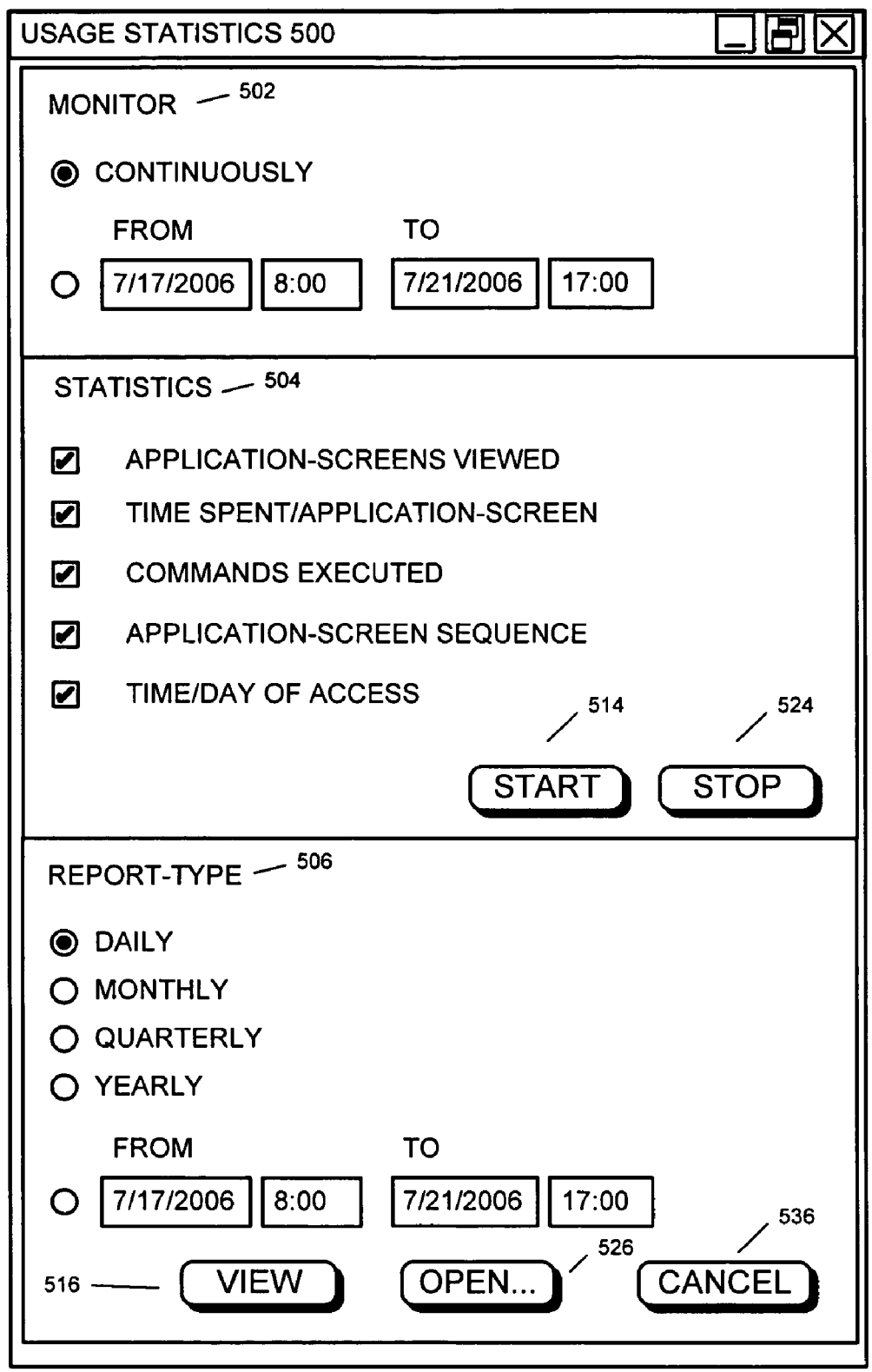
FIG. 5 illustrates a usage-statistics window in accordance with an embodiment of the present invention.

FIG. 5 illustrates a usage-statistics window 500 in accordance with an embodiment of the present invention.

When user 112 selects usage statistics 218, custom-workflow system 160 opens usage-statistics window 500. Usage-statistics window 500 includes monitor panel 502, statistics panel 504, and report type panel 506.

In one embodiment of the present invention, using the choices in monitor panel 502, user 112 can select whether custom-workflow system 160 should continually monitor user 112's actions or monitor user 112's actions for a given time-period.

In one embodiment of the present invention, user 112 can select from statistics panel 504 the information that user 112 wants custom-workflow system 160 to monitor. This information can include: application-screens viewed; time-spent per application-screen; the commands executed at each application-screen; the order that user 112 accesses and uses each application-screen; and the time and/or day that user 112 accesses and uses each application-screen.

In one embodiment of the present invention, clicking on start button 514 instructs custom-workflow system 160 to start monitoring user 112's actions as specified in monitor panel 502 and statistics panel 504.

In one embodiment of the present invention, clicking on stop button 524 instructs custom-workflow system 160 to stop monitoring user 112's actions regardless of whether the time-period specified in monitor panel 502 has elapsed. In this embodiment, after clicking stop button 524, user 112 has the opportunity to save the collected statistics to database 150.

In one embodiment of the present invention, report-type panel 506 enables user 112 to select a type of report that custom-workflow system 160 should generate. This report type can indicate whether the generated report should include daily statistics, monthly statistics, quarterly statistics, yearly statistics, or statistics for a user specified time-period.

In one embodiment of the present invention, clicking on view button 516 instructs custom-workflow system 160 to open a report window for a currently active set of collected statistics. This report window is described in more detail below with reference to FIG. 6.

In one embodiment of the present invention, clicking on open button 526 instructs custom-workflow system 160 to present a list of saved sets of collected statistics stored on database 150 from which user 112 can select. In this embodiment, user 112 can then click view button 516 to open a report window for a selected set of collected statistics.

User 112 can click cancel button 536 to close usage-statistics window 500.

Report Window

FIG. 6 illustrates a report window 600 in accordance with an embodiment of the present invention.

When user 112 selects suggest workflow 220 or view 516, custom-workflow system 160 opens report window 600. Report window 600 includes several tables, such as table 602, that present the usage statistics indicated in statistics panel 504.

In one embodiment of the present invention, table 602 includes: screens column 612, which specifies the application-screens user 112 viewed; commands column 614, which lists commands user 112 executed at the corresponding application-screen; time-spent column 616, which specifies the amount of time user 112 spent at the corresponding application-screen; and accessed column 618, which specifies when user 112 accessed the corresponding application-screen.

In one embodiment of the present invention, clicking suggest workflow button 620 instructs custom-workflow system 160 to suggest a custom workflow. In this embodiment, custom-workflow system 160 highlights the application-screen names, such as application-screen name 622, listed in screens column 612 that are part of the suggested custom workflow. Custom-workflow system 160 then tags the highlighted application-screen names with number-tags, such as number tag 624. These number-tags indicate the order that custom-workflow system 160 should add the application-screens associated with the highlighted application-screen names to the suggested custom workflow.

In one embodiment of the present invention, user 112 can add an additional application-screen to the suggested custom workflow by highlighting an application-screen name associated with the additional application-screen.

In one embodiment of the present invention, user 112 can change the order that the application-screens are included as part of the suggested custom workflow by altering the number-tags associated with the highlighted application-screen names.

In one embodiment of the present invention, user 112 can remove an application-screen from the suggested custom workflow by removing the highlight from the application-screen.

In one embodiment of the present invention, user 112 can save the suggested custom workflow by clicking the save workflow button 630.

In one embodiment of the present invention, user 112 can print the contents of report window 600 by clicking the print button 640.

User 112 can click close button 650 to close report window 600.

Creating a Custom Workflow

Figure 7:
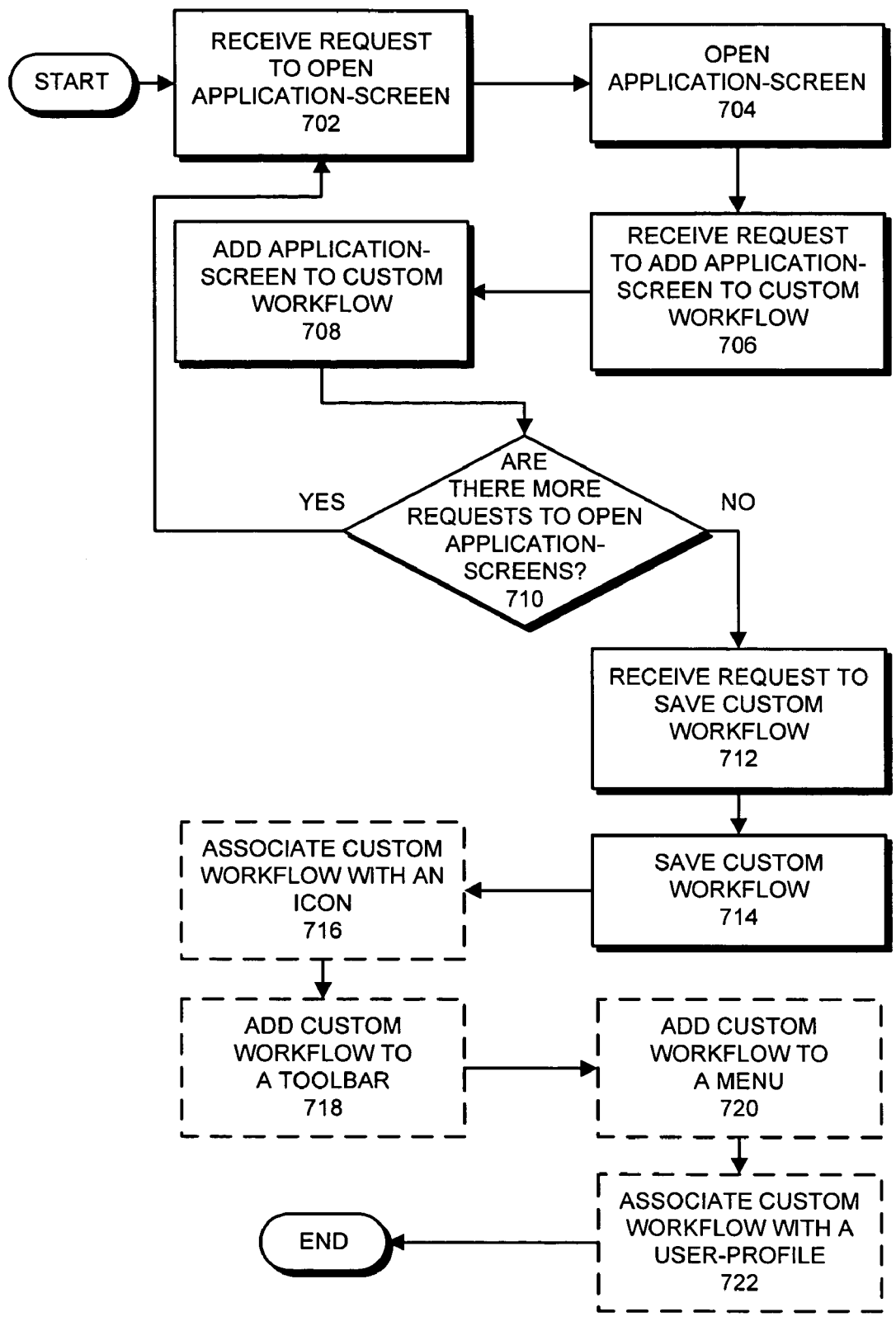
FIG. 7 presents a flow chart illustrating the process of creating a custom workflow in accordance with an embodiment of the present invention.

FIG. 7 presents a flow chart illustrating the process of creating a custom workflow in accordance with an embodiment of the present invention.

The process begins when custom-workflow system 160 receives a request to open an application-screen associated with application 145 from user 112 via client 110 (step 702). In response to the request, custom-workflow system 160 opens the application-screen at application 145 (step 704). Next, custom-workflow system 160 receives a request from user 112 to add the application-screen to a custom workflow (step 706). In response to the request, custom-workflow system 160 adds the application-screen to the custom workflow (step 708). Custom-workflow system 160 then determines if there are more requests to open application-screens (step 710). If so, custom-workflow system 160 returns to step 702. If not, custom-workflow system 160 receives a request to save the custom workflow from user 112 (step 712). In response to the request, custom-workflow system 160 saves the custom workflow on database 150 (step 714).

In one embodiment of the present invention, custom-workflow system 160 associates the custom workflow with an icon specified by user 112 (step 716). Custom-workflow system 160 then adds the custom workflow to a toolbar associated with application 145 (step 718). Next, custom-workflow system 160 adds the custom workflow to a menu associated with application 145 (step 720). Then, custom-workflow system 160 associates the custom workflow with a user-profile associated with user 112 (step 722). Steps 716, 718, 720, and 722 are optional as is illustrated by the dashed lines surrounding steps 716, 718, 720, and 722.

Executing a Custom Workflow

Figure 8:
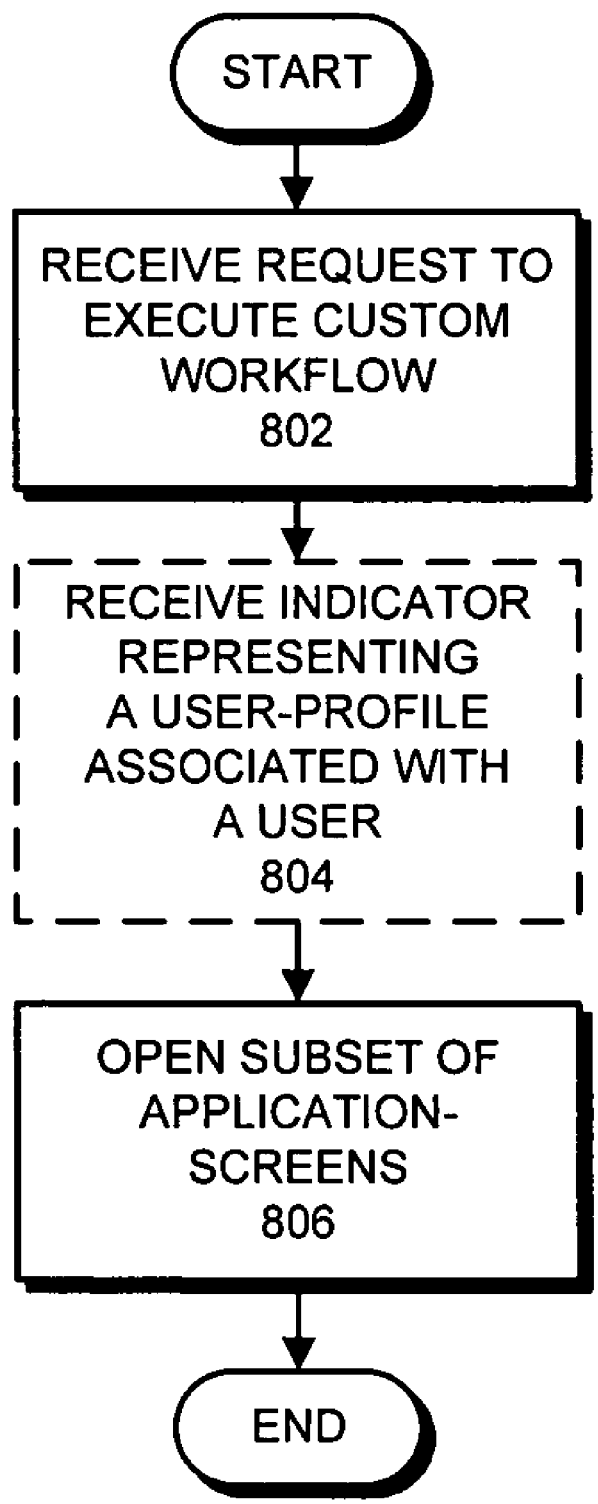
FIG. 8 presents a flow chart illustrating the process of executing a custom workflow in accordance with an embodiment of the present invention.

FIG. 8 presents a flow chart illustrating the process of executing a custom workflow in accordance with an embodiment of the present invention.

The process begins when custom-workflow system 160 receives a request to execute a custom workflow (step 802). This request can be in response to user 112 executing application 145, selecting execute command 237 from workflow sub-menu 210, or selecting an icon associated with the custom workflow from toolbar 240.

In one embodiment of the present invention, custom-workflow system 160 receives an indicator representing a user-profile associated with user 112 (step 804). In this embodiment, custom-workflow system 160 identifies the custom workflow to execute based on the user-profile associated with the indicator. This step is optional as is illustrated by the dashed lines surrounding step 804.

Next, custom-workflow system 160 executes the custom workflow by opening a subset of application-screens specified in the custom workflow (step 806). In one embodiment of the present invention, the subset of application-screens specified in the custom workflow includes all of the application-screens specified in the custom workflow.

Determining a Custom Workflow

Figure 9:
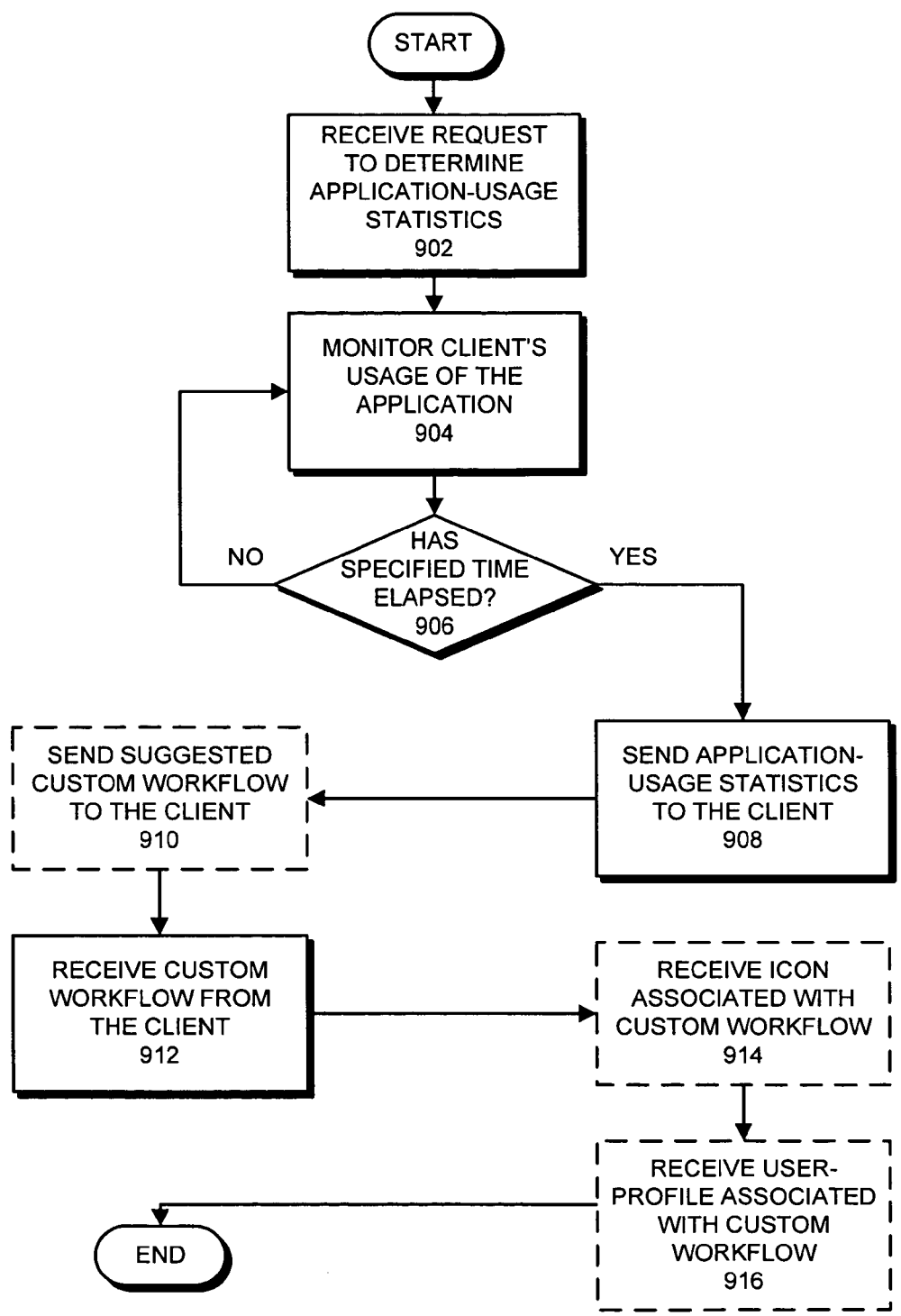
FIG. 9 presents a flow chart illustrating the process of determining a custom workflow in accordance with an embodiment of the present invention.

FIG. 9 presents a flow chart illustrating the process of determining a custom workflow in accordance with an embodiment of the present invention.

The process begins when custom-workflow system 160 receives a request to determine user 112's application-usage statistics for application 145 (step 902). In one embodiment of the present invention, the request can include a list of the desired application-usage statistics. In this embodiment, the application-usage statistics can include: an application-screen set which specifies a set of application-screens accessed by user 112, such as those listed in screens column 612; a sequence-record which specifies the order that user 112 accessed the set of application-screens; an access-time record which specifies when user 112 accessed the set of application-screens; a usage-time record that specifies for how long user 112 accessed each application-screen in the set of application-screens; and a usage record which specifies what operations user 112 executed on each application-screen in the set of application-screens.

In one embodiment of the present invention, the request can include a time-period rule, which specifies a time-period during which custom-workflow system 160 should monitor user 112's usage of application 145.

Next, custom-workflow system 160 monitors user 112's usage of application 145 (step 904). Custom-workflow system 160 then determines if a specified time-period has elapsed (step 906). Custom-workflow system 160 can determine this specified time-period from the time-period rule. If not, custom-workflow system 160 returns to step 904. If so, custom-workflow system 160 sends the application-usage statistics to client 110 to present to user 112 (step 908).

In one embodiment of the present invention, custom-workflow system 160 continually monitors user 112's usage of application 145. In this embodiment, custom-workflow system 160 sends application-usage statistics gathered during a time-period that user 112's specifies by clicking start button 514 at the beginning of the time-period and stop button 524 at the end of the time-period.

In one embodiment of the present invention, custom-workflow system 160 sends a suggested custom workflow to user 112 via client 110 (step 910). This step is optional as is illustrated by the dashed lines surrounding step 910.

Next, custom-workflow system 160 receives a custom workflow from user 112 via client 110 (step 912). In one embodiment of the present invention, the custom workflow can be the suggested custom workflow, an edited version of the suggested custom workflow, or a new custom workflow.

In one embodiment of the present invention, custom-workflow system 160 receives an icon associated with the custom workflow from user 112 (step 914). Then, custom-workflow system 160 receives a user-profile associated with the custom workflow from user 112 (step 916). Steps 914 and 916 are optional as is illustrated by the dashed lines surrounding steps 914 and 916.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for creating a custom workflow which facilitates performing repetitive processes by aggregating application-screens, the method comprising:
    receiving a request from a client to open an application-screen at an application;
    in response to the request to open the application-screen, opening the application-screen;
    receiving a request to add the application-screen to a custom workflow;
    in response to the request to add the application-screen, adding the application-screen to the custom workflow; and
    adding the custom workflow to a toolbar.

2. The method of claim 1, further comprising:
    receiving a request to save the custom workflow; and
    in response to the request to save the custom workflow, saving the custom workflow on a non-volatile storage medium.

3. The method of claim 2, wherein saving the custom workflow can involve:
    associating the custom workflow with an icon;
    adding the custom workflow to a menu; and
    associating the custom workflow with a user-profile.

4. The method of claim 1, further comprising:
    receiving a request to execute the custom workflow; and
    in response to the request to execute the custom workflow, executing the custom workflow by opening a subset of application-screens associated with the custom workflow, wherein the subset of application-screens can include the entire set of application-screens associated with the custom workflow.

5. The method of claim 4, wherein the custom workflow is executed in response to receiving a request from the client to execute the custom workflow.

6. The method of claim 4, wherein the custom workflow is executed in response to receiving from the client an indicator representing a user-profile associated with a user, wherein receiving the indicator enables the application to execute a custom workflow associated with the user-profile.

7. A method for producing a custom workflow which facilitates performing repetitive processes by aggregating application-screens, the method comprising:
    receiving a request from a client to determine application-usage statistics for an application;
    in response to the request, monitoring the client's usage of the application to obtain the application-usage statistics;
    sending the application-usage statistics to the client to aid the client in producing a custom workflow, wherein the client uses a combination of the application-usage statistics and a user-specified formula to create the custom workflow; and
    receiving from the client the custom workflow.

8. The method of claim 7, wherein the request to determine application-usage statistics can include a list of the desired application-usage statistics.

9. The method of claim 7, wherein the request to determine application-usage statistics can include a time-period rule which specifies a time-period for monitoring the client's usage of the application.

10. The method of claim 7, wherein the application-usage statistics includes at least one of:
    an application-screen set which specifies a set of application-screens accessed by the client;
    a sequence-record which specifies the order that the client accessed the set of application-screens;
    an access-time record which specifies when the client accessed the set of application-screens;
    a usage-time record which specifies how long the client accessed each application-screen in the set of application-screens; and
    a usage-record which specifies a set of operations executed while each application-screen in the set of application-screens was active.

11. The method of claim 7, wherein sending the application-usage statistics to the client involves sending a suggested custom workflow to the client.

12. The method of claim 7, wherein receiving the custom workflow can involve:
    receiving an icon associated with the custom workflow; and receiving a user-profile associated with the custom workflow.

13. The method of claim 7, further comprising:
receiving a request to execute the custom workflow; and
in response to the request to execute the custom workflow, executing the custom workflow by opening a subset of application-screens associated with the custom workflow, wherein the subset of application-screens can include the entire set of application-screens associated with the custom workflow.

14. The method of claim 13, wherein the custom workflow is executed in response to receiving a request from the client to execute the custom workflow.

15. The method of claim 13, wherein the custom workflow is executed in response to receiving from the client an indicator representing a user-profile associated with a user, wherein receiving the indicator enables the application to execute a custom workflow associated with the user-profile.

16. A computer-readable storage medium storing instructions that when executed by a computer cause the computer to perform a method for creating a custom workflow which facilitates performing repetitive processes by aggregating application-screens, the method comprising:
receiving a request from a client to open an application-screen at an application;
in response to the request to open the application-screen, opening the application-screen;
receiving a request to add the application-screen to a custom workflow;
in response to the request to add the application-screen, adding the application-screen to the custom workflow; and
adding the custom workflow to a toolbar.

17. The computer-readable storage medium of claim 16, wherein the method further comprises:
receiving a request to save the custom workflow; and
in response to the request to save the custom workflow, saving the custom workflow on a non-volatile storage medium.

18. The computer-readable storage medium of claim 17, wherein saving the custom workflow can involve:
associating the custom workflow with an icon;
adding the custom workflow to a menu; and
associating the custom workflow with a user-profile.

19. The computer-readable storage medium of claim 16, wherein the method further comprises:
receiving a request to execute the custom workflow; and
in response to the request to execute the custom workflow, executing the custom workflow by opening a subset of application-screens associated with the custom workflow, wherein the subset of application-screens can include the entire set of application-screens associated with the custom workflow.

20. The computer-readable storage medium of claim 19, wherein the custom workflow is executed in response to receiving a request from the client to execute the custom workflow.

21. The computer-readable storage medium of claim 19, wherein the custom workflow is executed in response to receiving from the client an indicator representing a user-profile associated with a user, wherein receiving the indicator enables the application to execute a custom workflow associated with the user-profile.

22. A computer-readable storage medium storing instructions that when executed by a computer cause the computer to perform a method for producing a custom workflow which facilitates performing repetitive processes by aggregating application-screens, the method comprising:
receiving a request from a client to determine application-usage statistics for an application;
in response to the request, monitoring the client's usage of the application to obtain the application-usage statistics;
sending the application-usage statistics to the client to aid the client in producing a custom workflow, wherein the client uses a combination of the application-usage statistics and a user-specified formula to create the custom workflow; and
receiving from the client the custom workflow.

23. The computer-readable storage medium of claim 22, wherein the request to determine application-usage statistics can include a list of the desired application-usage statistics.

24. The computer-readable storage medium of claim 22, wherein the request to determine application-usage statistics can include a time-period rule which specifies a time-period for monitoring the client's usage of the application.

25. The computer-readable storage medium of claim 22, wherein the application-usage statistics includes at least one of:
an application-screen set which specifies a set of application-screens accessed by the client;
a sequence-record which specifies the order that the client accessed the set of application-screens;
an access-time record which specifies when the client accessed the set of application-screens;
a usage-time record which specifies how long the client accessed each application-screen in the set of application-screens; and
a usage-record which specifies a set of operations executed while each application-screen in the set of application-screens was active.

26. The computer-readable storage medium of claim 22, wherein sending the application-usage statistics to the client involves sending a suggested custom workflow to the client.

27. The computer-readable storage medium of claim 22, wherein receiving the custom workflow can involve:
receiving an icon associated with the custom workflow; and
receiving a user-profile associated with the custom workflow.

28. The computer-readable storage medium of claim 22, wherein the method further comprises:
receiving a request to execute the custom workflow; and
in response to the request to execute the custom workflow, executing the custom workflow by opening a subset of application-screens associated with the custom workflow, wherein the subset of application-screens can include the entire set of application-screens associated with the custom workflow.

29. The computer-readable storage medium of claim 28, wherein the custom workflow is executed in response to receiving a request from the client to execute the custom workflow.

30. The computer-readable storage medium of claim 28, wherein the custom workflow is executed in response to receiving from the client an indicator representing a user-profile associated with a user, wherein receiving the indicator enables the application to execute a custom workflow associated with the user-profile.

31. An apparatus that creates a custom workflow which facilitates performing repetitive processes by aggregating application-screens, the apparatus comprising:

a receiving mechanism configured to receive a request from a client to open an application-screen at an application;

an opening mechanism configured to open the application-screen;

a receiving mechanism configured to receive a request to add the application-screen to a custom workflow;

an inclusion mechanism configured to add the application-screen to the custom workflow; and a toolbar mechanism configured to add the custom workflow to a toolbar.

32. An apparatus that produces a custom workflow which facilitates performing repetitive processes by aggregating application-screens, the apparatus comprising:

a receiving mechanism configured to receive a request from a client to determine application-usage statistics for an application;

a monitoring mechanism configured to monitor the client's usage of the application to obtain the application-usage statistics;

a sending mechanism configured to send the application-usage statistics to the client to aid the client in producing a custom workflow, wherein the client uses a combination of the application-usage statistics and a user-specified formula to create the custom workflow; and a receiving mechanism configured to receive the custom workflow from the client.

\* \* \* \* \*